INVENTOR.
KENNETH B. LORD
BY Arthur H. Swanson
ATTORNEY.

Oct. 17, 1961     K. B. LORD     3,004,880
CONTROL METHOD AND APPARATUS
Filed Oct. 28, 1959     2 Sheets—Sheet 2

*INVENTOR.*
KENNETH B. LORD

BY *Arthur H. Swenson*
ATTORNEY.

United States Patent Office 3,004,880
Patented Oct. 17, 1961

3,004,880
CONTROL METHOD AND APPARATUS
Kenneth B. Lord, Irvington on Hudson, N.Y., assignor to Minneapolis-Honeywell Regulator Company, Minneapolis, Minn., a corporation of Delaware
Filed Oct. 28, 1959, Ser. No. 849,354
19 Claims. (Cl. 156—64)

The object of the present invention is to provide a method of and control apparatus for so controlling the production of a corrugating machine so as to eliminate board curling which has heretofore been encountered in the prior art.

The object of the present invention is to provide a control apparatus which will prevent transverse curling or warping from occurring in a board that is being produced by a corrugating machine.

Prior to the present invention it has been the practice to employ adjustable brakes on the rolls which feed two liners of a board through the corrugating machine so as to tension the two liners in the direction in which the machine is feeding and thus eliminate longitudinal curling or warping. However, tension adjustments of this type have been of no material assistance in removing curling or warping in a direction that is transverse to the direction of travel of the board as it passes through and out of the corrugating machine.

Experimentation has shown that when a two-surface corrugated board is produced by present-day corrugating machines that the corrugated board which these machines produce possesses certain undesired curling and/or warping characteristics which are due to improper temperatures, and/or moisture contents of the liners and corrugating medium. These improper conditions occur between the upper and lower liner at the point where the machine glues the lower corrugated surface of a single-face corrugated board to a lower liner to form the corrugated board. One problem encountered by manufacturers producing board of this type is that such curling and/or warping greatly limits the use to which this corrugated board can be employed and hence the saleability of the board. Another condition manufacturers have experienced with this type of board is that it is very difficult and expensive to handle because of its curled or warped condition. For example it has been found that it is difficult, with boards which are in this curled condition, to stack them in layers, enable smooth printing to be inscribed thereon, to slot or to be glued together to form cartons.

It is still a further object of the present invention to provide a controlling apparatus of the type previously referred to supra which will enable a corrugating machine to produce a two-faced board which will not possess undesired warping and/or curling characteristics and which will therefore eliminate the costly time consuming handling difficulties referred to supra.

Another more specific object of the present invention is to provide a control apparatus for a corrugating machine which will maintain the liners and corrugating medium in a transverse dimensional relationship that will produce a flat board.

It is also another object of the present invention to provide a corrugating machine with a control apparatus that will maintain the transverse dimensional relationship between the upper liner of a single-face corrugated board, which has a corrugated medium glued thereto and the lower liner as it is brought into contact with the lower face of the corrugated medium and glued thereto in order to produce a flat board.

It is still another object of the present invention to disclose a temperature control apparatus of the aforementioned type which will eliminate curling or warping of a board by maintaining temperature and moisture content conditions which will not ultimately result in transverse dimensional differences in the board after the parts of the board are joined together and have passed through and out of a corrugating machine.

It is another specific object of the invention to provide a temperature control apparatus to increase the temperature level of certain liners and/or corrugating medium while the temperature level of the remaining liners and/or medium is being decreased in a corrugating machine to eliminate the undesired final curling or warping effect that different moisture content conditions in the top liner, corrugating medium and bottom liner have as these parts are passed through the machine.

More specifically another object of the invention is to provide manually adjusted regulators for the type of controller apparatus referred to supra which will enable the operator of a corrugating machine to alter the control settings of temperature control instruments used in this control apparatus so as to prevent the machine from producing a board having an undesired up-curl or down-curl characteristic.

Another object of the present invention is to employ two of the aforementioned manually adjusted regulators each of which establishes a desired base level of temperature control for two controlling instruments that are being used to control the temperature level of liners and corrugated medium.

A further object of the present invention is to provide two additional manually adjusted regulators which will enable the operator of a corrugating machine to differentially alter the control settings of the aforementioned temperature controlling instruments so as to prevent the machine from producing a board having an undesired up-curl or down-curl characteristic.

It is another object of the present invention to provide a modified form of regulator for the type of controller apparatus referred to supra, which will automatically differentially alter the control settings of temperature controlling instruments of a corrugating machine so as to prevent the machine from producing a board having an undesired up-curl or down-curl characteristic.

More specifically it is a further object of the present invention to employ with each of the aforementioned additional manually adjusted regulators a direct-acting pneumatic ratio relay which will act to automatically raise the set point temperature control setting of one of the aforementioned temperature controlling instruments above the base temperature level while a reverse acting ratio relay acts to lower the set point temperature control setting of the other aforementioned controlling instruments below the base temperature level, so as to correct for up or down-curl and to enable the corrugating machine to produce a flat board.

Another object of the invention is to provide an automatic control system of the aforementioned type which will provide an interrupted type of floating control with dead neutral.

In the drawings:
FIGURE 1 shows how the controlling apparatus disclosed herein can be installed on a corrugating machine in order to eliminate transverse curling or warping;
FIGURE 2 shows one form of transverse curl which the control apparatus disclosed in FIGURE 1 will eliminate;
FIGURE 3 shows still another form of transverse curl which the control apparatus disclosed in FIGURE 1 will eliminate;
FIGURE 4 shows a typical inside view of one of four controllers disclosed in FIGURE 1;
FIGURE 5 shows an electric diagram of how an interruptor circuit may be employed to intermittently cut in the control action of the controller shown in FIGURE 4 to thereby effect a control of the position of a wrap arm motor shaft;

Figure 1:
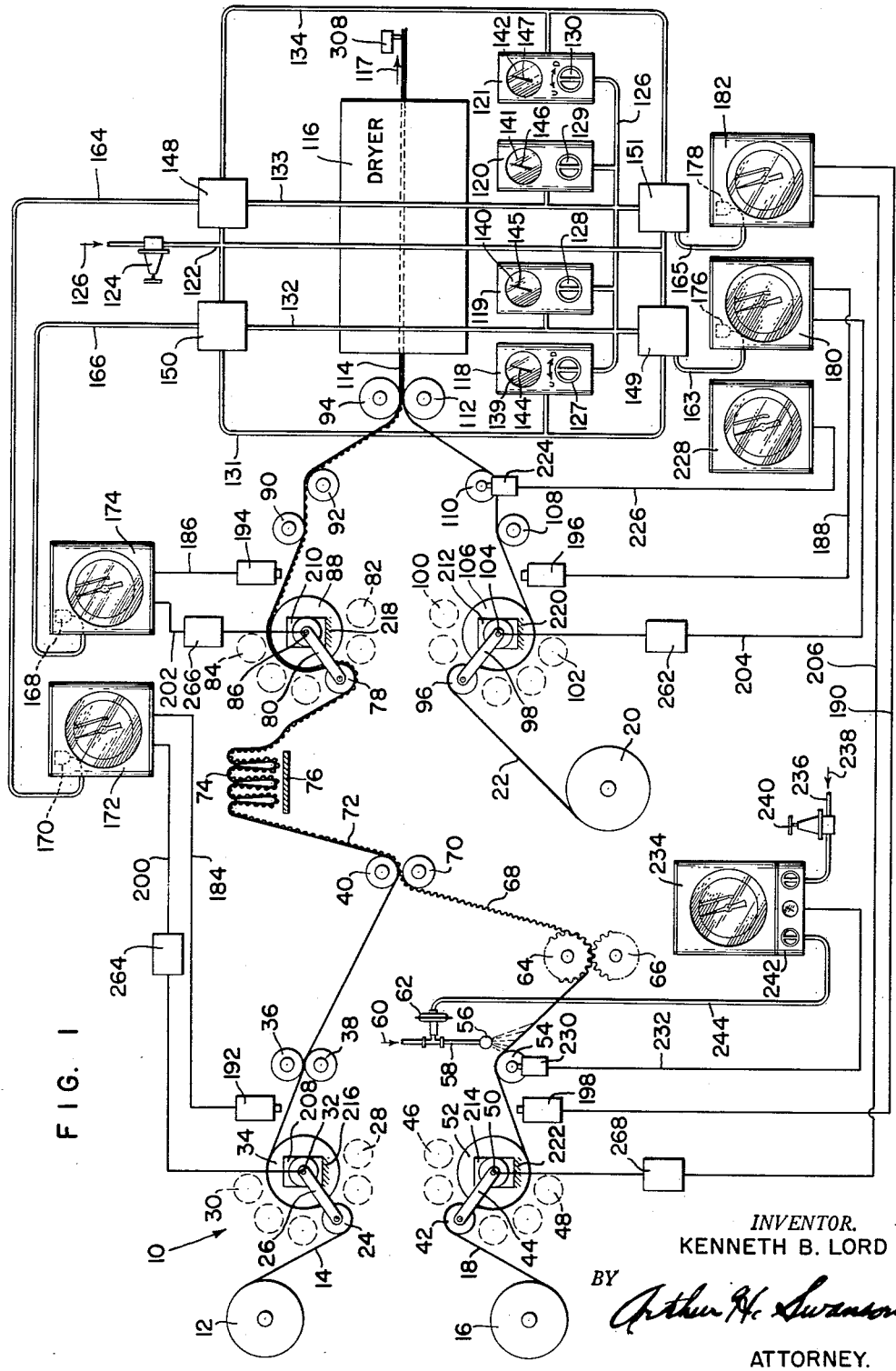

A typical present-day high-speed corrugating machine 10 such as in schematically shown in FIGURE 1 is provided with three supply reels namely the reel 12 from which the upper liner 14 of the board is supplied, the reel 16 from which the medium 18 to be corrugated or fluted is supplied and the reel 20 from which the bottom liner 22 of the board is supplied.

The upper liner 14 of the board leaves the drum 12 as shown in FIGURE 1, is wrapped about the roller 24 which is connected to one end of the wrap arm 26. This wrap arm roller 24 is shown located in a position which lies between a selected extreme maximum drying position 28 and an extreme minimum drying position 30. The other end of the wrapped arm 26 is pivotally supported on a shaft 32 so as to provide a means by which the roller 24 can be rotated about the center line of the rotatable beater roller 34. The liner 14 is shown passing between a back up roller 36 and a glue applicator roller 38 and thence under tension into contact with the press roll 40.

While the upper liner 14 is being fed under tension from supply roll 12 the board medium 18 to be corrugated is simultaneously fed from its reel 16 about the roller 42 which is connected to one end of a wrap arm 44. This wrap arm roller 42 is shown positioned in a location which lies between a selected extreme maximum drying position 46 and a minimum drying position 48. The other end of the wrap arm 44 is pivotally supported on a shaft 50 to provide a means by which the roller 42 can be rotated about the center line of the second heater roll 52. The medium 18 is then shown passing over a tension roll 54 and under a steam spray header 56 which is in turn connected by way of conduit 58 to a steam supply flowing in the direction of the arrow 60.

A valve which may be of a diaphragm actuated type 62 is shown connected to and forming a part of the steam flow that is passing through the conduit 58. The medium 18 is then shown passing between two corrugated rolls 64, 66. As the medium 18 leaves the right end of these rolls 64, 66 it can be seen that the corrugations 68 have been placed in the strip by the rolls 64, 66. In this corrugated condition the upper peaks of this medium is then brought into engagement with the sticky glue coated underside surface of the upper liner 14 while a press roll 70 applies a slight pressure to the lower valleys formed by the corrugations 68 in the medium 18 to enable the upper surface of the medium 18 to be glued to the lower surface of the upper liner 14.

It should of course be understood that the moisture controlling apparatus disclosed herein can be used with equal advantage where larger or smaller corrugating rolls are substituted for the rolls 64, 66. Such a roller change is necessary when the paper board manufacturer desires to alter the size of the corrugation medium or flute 68 to meet a particular board specification.

It should also be understood that similar moisture controlling apparatus as that disclosed could be used in the manufacture of double facer boards, in the manner similar to the way the single facer board 72 was produced.

After passing through the press rolls 40, 70 it can be seen that a single face board 72 is formed which is comprised of the corrugated medium 68 and the upper liner 14. Several curved portions of this single face board 72 in a non-tension condition as shown at 74 are then slid along a guide plate 76.

The corrugating machine operation so far described, wherein the portions of the board 14, 18 are joined together to form the single face board 72 is commonly referred to in the paper board industry as a single facer. The remaining operation of the corrugating machine to be hereinafter described is commonly referred to as the double backer. The single face board 72 leaves the right end of the guide plate 76 and is wrapped about the roller 78 which is connected to one end of the wrap arm 80. This wrap arm roller 78 is shown positioned in a location which lies between a selected extreme maximum drying position 82 and an extreme minimum drying position 84. The other end of the wrap arm 80 is pivotally supported on shaft 86 so as to provide a means whereby the rotatable roller 78 can be rotated about the center line of a third rotatable heater roll 88.

After the single face board 72 leaves the third heater roll 88 a predetermined amount of moisture will have been removed from the board 72 depending on the time the heat passing from the warm portion of the wall of the roll 88 is allowed to remain in contact with any given moving portion of the single face board 72.

The board 72 then passes under a tension roll 90 and in a tension condition over a glue applicator roll 92 and into engagement with the outer peripheral portion of a press roll 94.

While the single face board is being fed through the aforementioned corrugation machine in the manner just described the bottom liner 22 is also being fed from its supply reel 20 in a wrapped manner about the roller 96 which is connected to one end of a wrap arm 98.

The wrap arm roller 96 is shown positioned in a location which lies between a selected extreme maximum drying position 100 and its extreme minimum drying position 102. The other end of the wrap arm 98 is pivotally supported on shaft 104 so as to provide a means whereby the roller 96 can be rotated about the center line of a fourth rotatable heater roll 106.

After the bottom liner 22 leaves the fourth heater roll 106 a predetermined amount of moisture will have been removed from the bottom liner depending on the time the heat passing from the warm portion of the wall of the roll 106 is allowed to remain in contact with any given moving portion of the bottom liner 22.

The bottom liner 22 then passes over one tension roll 108 under another tension roll 110 and then over press roll 112. This press roll 112 applies a slight pressure to the lower surface of the bottom liner 22 to enable its upper surface to be glued to the lowermost portion of the corrugated portion 68 of the single face board 72.

After passing through the press rolls 94, 112 it can be seen that a complete still moist double face board 114 is formed which is comprised of the single face board 72 and the bottom liner 22. This moist double face board is then passed through a dryer 116 so that a properly dried glued double face finished board will have been produced when the board 114 leaves the right end of the dryer in the direction of the arrow 117 shown in the drawing.

The aforementioned described corrugating machine is of a well-known commercially available type and a schematic version of same has been described in order to more readily understand the moist condition of the corrugated portion and the upper and lower liners as these parts are made into a completed double face board. In this way it is believed that the function of the control apparatus which will now be described can be more readily understood.

At the extreme right end of FIGURE 1 of the drawing there is shown four pneumatic loading stations 118, 119, 120, 121 each having an air pressure regulator and a pressure indicating gauge. Each loading station is connected by way of the conduit 122 through a pressure regulator 124 to an air supply source, not shown. The air pressure from this source is applied in the direction of the arrows 126. Each air pressure regulator of loading stations 118–121 is provided with an adjustable rotatable knob 127, 128, 129 or 130 for altering a pressure that is applied within their respective outlet conduits 131, 132, 133 or 134.

Each of the pressure gauges of the pneumatic loading stations 118—121, are provided with an indicator face 139, 140, 141, or 142 over which their associated pointers 144, 145, 146 or 147 are caused to travel in a clockwise direction when their associated knobs 127, 128, 129, and 130 are rotated clockwise. The control action resulting from the adjustment of control knobs 128 and 129 is for the purpose of establishing a desired base level of temperature control for temperature controllers to be hereinafter described.

Figure 3:
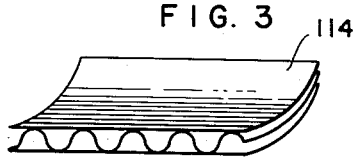

The control action resulting from the clockwise adjustment of the control knob 127 and/or 130 is for the purpose as will be hereinafter described of eliminating the type of up-curl as is indicated for the finished board in FIGURE 3 in order to restore it to a flat condition.

Figure 2:
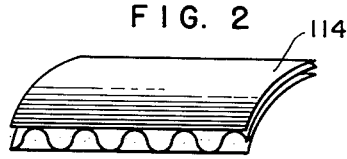

The control action resulting from the counterclockwise adjustment of control knob 127 and/or 130 is for the purpose, as will hereinafter be described, of eliminating the type of down-curl as is indicated for the finished board in FIGURE 2 in order to restore it to its flat condition.

The output pressure that is within the conduits 131 and 134 is applied to the associated ratio relays 148, 149, 150 and 151.

These relays 148–151 are each of a type which produces a pneumatic output signal that is proportional to two input signals being fed into the relay. These relays may be for example the pneumatic set ratio relay type disclosed in the W. R. Bailey Patent 2,771,897, filed May 27, 1953; issued November 27, 1956.

Each ratio relay 148–151 is connected by conduit 122 through air pressure regulator 124 to a suitable air pressure source, not shown.

Rotation of knobs 127, 130 of the pressure regulators at the pneumatic loading stations 118, and 121 vary the loading pressure to the ratio setting bellows of the ratio relays 148, 149, 150 and 151.

This loading pressure variation causes the ratio relays to vary the pneumatic set point signal that is transmitted by way of conduits 163–166 to the index setting mechanism 168, 170, 176, and 178. The resulting variation in magnitude of the transmitted signal by relays 149, 151 is a direct function of the magnitude of the ratio setting pressure and the base temperature loading pressure being applied through conduits 132, 133.

The resulting variation in magnitude of the transmitted signal by relays 148, 150 is an inverse function of the magnitude of the ratio setting pressure and the base temperature loading pressure being applied through the conduit 132, 133.

The aforementioned referred to index setting mechanism 168, 170, 176, 178 may be of an adjustable type as is disclosed in the E. C. Burdick Patent 2,548,943, filed August 2, 1946, issued April 7, 1951, or preferably as shown of a fixed type as is disclosed in the Gess Patent 2,381,948, filed January 29, 1942, issued August 14, 1945. The index setting mechanism 168, 170 are schematically shown respectively located within the low range radiation type temperature indicating and recording electric contact controller indicator 172 for the upper liner in the single facer and the low range type temperature indicating and recording radiation electric contact controller indicator 174 for the single face board in the double backer. The index setting mechanism 176, 178 are schematically shown respectively located within the low range radiation type temperature indicating and recording electric contact controller indicator 180 for the lower liner of the double backer and the low range type temperature indicating and recording electric contact controller 182 for the flute or corrugating medium in the single facer.

Each of the low range type temperature indicating and recording electric contact controllers 172, 174, 180 and 182 include a measuring circuit 183 which is of the type which is disclosed in the Wills Patent No. 2,423,540, filed December 1, 1941, issued July 8, 1947. Each of these controllers 172, 174, 180, and 182 receives an electrical input signal by way of their associated conductors 184, 186, 188, and 190 from the low range radiation pyrometers 192, 194, 196 and 198 with which these conductors are associated. Each of these radiation pyrometers may be of a type which is disclosed in either the Wannamaker, Jr. et al. Patent 2,528,626, filed April 30, 1947, issued November 7, 1950, or the Dyer Patent 2,562,538, filed February 1, 1947, issued July 31, 1951.

Figure 4:
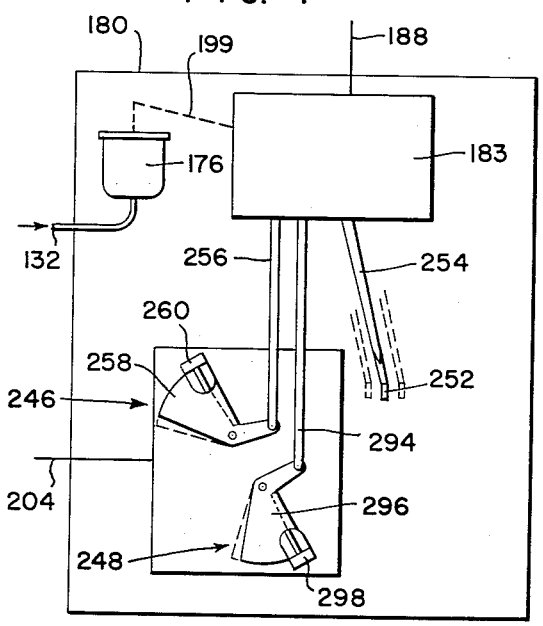

Each of the index setting mechanisms 168, 170, 176 and 178 have, as is chematically shown for the mechanism 176 in FIGURE 4 of the drawing, a linkage 199. This linkage is actuated in accordance with the magnitude of pressure that is being applied by way of conduit 132. The other end of the linkage is connected to the pen actuating mechanism of the measuring circuit 183.

It should be noted that if any differences exist in the moisture content of the individual parts of the board when the temperature of the parts of the board are identical at the time they are glued together these differences will ultimately result in transverse dimensional differences between the board parts. Hence these dimensional differences will result in warping and/or curling of the board when the moisture contents and temperatures of the parts of the board that has been produced have arrived at an equilibrium condition.

Likewise any differences in temperatures that exist in the individual parts of the board when the moisture content of the parts of the board are identical will also produce a curled or warped board in the manner just described. Also, when certain different temperature and moisture content conditions exist between the parts of the board a warped or curled board can likewise result in this same manner.

Experimentation has shown that these warp and/or curl producing effects of temperature differences and board warp and/or curl producing effect of moisture content differences can be controlled to cancel out one another. There is however always a desired combination of moisture contents of the parts of the board and the temperatures of the parts of this board which will result in the production of a flat board without dimensional differences in the parts of the board.

It is of primary importance to note that the apparatus to be hereinafter disclosed is arranged to maintain the board parts at the aforementioned desired combination of moisture contents and temperatures.

The function of each of these radiation pyrometers 192, 194, 196, 198 is to sense the temperature condition of the upper liner 14 of the single facer, the single face board 72 of the double backer, the bottom liner 22 of the double backer and the flute or corrugated medium 18 of the single facer whose temperatures and moisture content differences refer to supra often result in the production of a board having a traverse curl or warp. These pyrometers 192–198 transmit an electrical signal proportional to each of the respective temperature conditions of the board parts as an input signal to their associated controllers 172, 174, 180 and 182.

Each of these controllers 172–182 are shown arranged to transmit an output signal by way of their associated conductors 200, 202, 204, 206 to their associated electric motor and gear reduction units 208, 210, 212 and 214.

These latter mentioned units are mounted on their associated stationary support members 216, 218, 220, and 222. Each of these units 208, 210, 212, and 214 are operably connected to their associated shafts 32, 86, 104, and 50 to move their respective wrap arms 26, 80, 98, 44 and the wrap arm rollers 24, 78, 96, and 42 away from their solid line position to one of the dotted line roller positions such as is shown between the associated maximum and minimum roller positions 28, 30; 82, 84; 100, 102; 46 and 48. Such a movement takes place whenever a difference arises between the set point pressure signal delivered by the respective ratio relays 148–151 to the index mechanisms 170, 176, 168, 178 and the signal being sent to each controller by its associated low range radiation pyrometers 192–198.

When a down-curl condition is observed in the board 114 as it is moved through and out the dryer, 116, end of the machine in the direction of the arrow 117, shown in FIGURE 1, the operator rotates the regulators 127 and 130 towards their "U" or up-curl position. An increase in the magnitude of the control pressure is then applied by way of conduits 131, 134 to the ratio bellows of the direct acting ratio relays 149 and 151 and the reverse acting ratio relays 148 and 150. This increase in magnitude of the control pressure will cause the magnitude of the set point pressure which the direct acting relays 149, 151 are transmitting by way of conduits 163, 165 to the index setting mechanisms 176, 178 to likewise be increased.

While this increase in magnitude of the set point, pressure takes place a simultaneous decrease in the magnitude of the set point, pressure which the reverse acting relays 148, 150 are then transmitting to the index setting mechanisms 170, 168 also occurs. It can thus be seen that the aforementioned control action is such that the temperature set point of controllers 172 and 174 will thereafter effect a temperature control action on their respective wrap arm motor units 208 and 210 and the wrap arms 26, 80 attached thereto. This last-mentioned control action will be such that it will increase the temperature of their respective upper liners 14 and single face board 72 by having the motors 208 and 210 move the wrap arms 26, 80 and rollers 24, 78 respectively attached thereto in a down-wrap or in a counter-clockwise direction.

This increasing of the temperature in the upper liner 14 and single face board 72 is brought about because these board parts will be in contact with their heater rolls 34 and 88 for a longer period of time after this down-wrap arm control action was effected than was the case before this control action took place.

While this down-wrap control takes place the previously mentioned increase in the magnitude of the set point pressure will, in a similar but reverse manner to that already described, cause the controllers 180, 182 to send an electrical signal to their motor units 212, 214 which will move their respective wrap arms 98, 44 and the rollers 96, 42 associated therewith in a down-wrap or counter-clockwise direction to decrease the temperature of the respective lower liner 22 and flute medium 18.

This decrease in the temperature of the lower liner 22 and flute medium 18 is brought about because the board parts will be in contact with their heater rolls 106 and 52 for a shorter period of time after this wrap arm control action was effected than was the case before this control action took place.

It can thus be seen that this control action simultaneously decreases the temperature of the lower liner 22 and flute member 18 while it simultaneously increases the temperature of the upper liner 14 and single face board 72.

It can further be seen that such a simultaneous temperature raising and lowering of the board parts will result in procuring a flat board even though the moisture contents and temperatures of the respective board parts would be so related with one another that they would normally, without this control, produce a down-curl shaped and/or warped board.

It can also be readily seen from the aforementioned description of the control apparatus that a similar but opposite type of wrap arm movement of the wrap arms 26, 80, 44, and 98 will occur when an up-curl condition is observed in the board 114 as it is moved through and out of the dryer, 116, end of the machine and the regulators 127 and 130 are rotated toward their "D" or down-curl position shown in FIGURE 1.

Such a control action will thus cause an increase in the temperature of the lower liner 22 and flute medium 18 while it simultaneously decreases the temperature of the upper liner 14 and single face board 72.

It can be seen that such a temperature lowering and raising of the board parts when this latter mentioned control action takes place will also result in the production of a flat board even though the relationship of the moisture contents and temperatures existing between the respective board parts are such that they would normally, without this control, produce an up-curl shaped and/or warped board.

FIGURE 1 of the drawing also shows a tachometer generator 224 connected by a suitable two wire connection 226 to a speed indicator 228. The sole purpose of this apparatus is to provide a means to indicate that the board control apparatus that has been described supra is in no way interfering with the over-all normal operating conditions under which the corrugating machine 10 is being operated.

FIGURE 1 of the drawing also shows a tachometer generator 230 to sense the speed at which tension roll 54 is rotating and to transmit an electrical signal proportional to the speed by way of an electric connection 232 to a controller 234. This controller 234 has an air pressure supply conduit 236 through which air under pressure is supplied in the direction of the arrow 238 from a supply source, not shown. This pressure conduit 236 is transmitted through a pressure regulator and filter device 240 to the controller 234. This controller 234 may be provided with a manual control bypass panel 242 which affords a conventional automatic shifting between an automatic and manual control position and between a manual and automatic control position. In either event the controller is of the type which will produce an output pressure signal in the transmission conduit 244 so that valve 62 in the steam conduit 58 will adjust the flow of steam passing out of the header 56 onto the medium 18 which is to be corrugated to a control rate that is governed by the difference that exists between the magnitude of speed at which the tension roll is rotating as sensed by the tachometer generator 230 and the magnitude of the set point to which the controller 234 is set.

Figure 5:
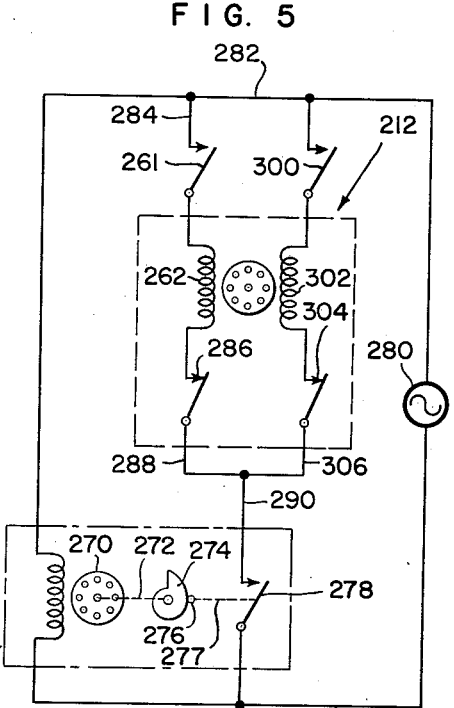

To enable each of the aforementioned low range type temperature indicating and recording electric controllers 172, 174, 180 and 182 to perform an interrupted type of floating control with dead neutral each of these controllers is provided with two electronic valve units 246, 248 which are each of the vane type disclosed in the Wannamaker Patent 2,564,937, filed August 31, 1946, issued August 2, 1951, along with an interruptor unit 250. This type of floating control with dead neutral is shown by way of illustration in FIGURES 4 and 5 of the drawing for controller 180.

However, it should be understood that this type of interrupted floating control with dead neutral is also affected by the other controllers 172, 174, and 182 in an identical manner to that which will hereafter be described for the controller 180.

The vane-type floating control which is described in detail in the aforementioned Wannamaker patent is of the type in which control actions are affected through an electronic valve and an associated relay means by which each valve is caused to operate, or not to operate, as an oscillator, accordingly as to whether a control quantity has one or another value.

The controlled quantity in the instant apparatus is the magnitude of the rotary output motion of pen shaft 252 of the measuring unit 183. If the direction of the motion is such as to cause the pen arm 252 to move away from its set point position, wherein it is aligned with the index pointer 254 as shown in FIGURE 4, in a counterclockwise or down-scale direction through the lower half of the dead neutral portion and past the dotted line portion shown to the left of the solid line pen position the arm 256 which is connected to the pen shaft, will have then moved the vane 258, out of alignment with the coil 260 of the vane oscillator circuit. As soon as the pen arm 252 passes this dotted line position a relay in this vane controller circuit is energized, an electrical contact 261 of this relay is closed and a current is permitted to flow from the vane controller 246 to energize the motor winding 262. It should be understood that the other controllers 172, 174 and 182 also have similar interruptor units 264, 266 and 268 associated therewith as is shown in FIGURE 1.

An interruptor unit 250 is also shown in this electric motor control circuit which contains a motor 270.

This interruptor motor 270 is shown schematically as having a shaft 272 on which there is mounted a cam 274. A roller 276 is also shown in contact with the outer surface of the cam 274 and having its other end connected by means of a link 277 to sequentially open and close a switch 278 for a predetermined period of time during each rotation of the cam 274. The arrangement is such that when vane 258 has been moved in a counter-clockwise direction from its solid line position just past its dotted line position, as shown in FIGURE 4, the current is then permitted to flow through the then closed switch 261 to the motor winding 262 for a few seconds. This current will flow during the period of time in which the interruptor motor 270 is rotating the cam 274, and the roller 276 which is then in contact therewith is in engagement with the lowermost peripheral surface of this cam. When the cam 274 is in this latter mentioned position the switch 278 will be in a closed position and current will be permitted to flow from a power source 280 through conductors 282, 284, switch 261 energize the up-wrap motor coil 262 of the motor gear reduction and switch unit 212 through the high limit switch 286 in this motor unit the conductor 288, 290, switch 278 and conductor 292.

From the aforementioned description of the controller 180 it can thus be seen that no control action to energize the wrap arm motor winding will be effected while the pen arm 252 is operating between its solid set point position and the dotted line position which is immediately to the left of this solid line position as shown in FIGURE 4 of the drawing. When however the pen arm 252 has been moved past the dotted position which is immediately to the left of the solid line position and this pen motion has caused the arm 256 to simultaneously move the vane 258 past its dotted line position an up-wrap rotary motion of the motor unit 212 due to the energization of winding 262 will be effected by means of the closing of the relay contact 161. The high radial portion of the cam 274 of the interruptor unit 250 is thereafter employed to move follower 276 to the right to open switch 278 for a fixed period of time to thus interrupt the movement of the wrap arm and to cause the arm to be moved in a step by step manner in an up-wrap direction during a portion of each rotation of the interruptor cam 274. This control action continues until the electrical signal being fed in through the conductor 188 to the measuring circuit 183 has caused the pen arm to again return to a selected set point position such as the solid line pen position 252.

In a similar but opposite manner it can be seen that as the pen 252 is moved in an up-scale direction between its solid line position shown in FIGURE 4 of the drawing counter-clockwise to the dotted position which is to the right of the solid line position, the arm 294 will simultaneously be moved in a downward direction and cause the vane 296 to move from its solid line position to its dotted line position. While this pen and vane action takes place neither the windings 262 nor 302 of the wrap arm motor unit 212 will be energized. However as soon as the pen 252 and vane 296 pass their respective dotted line positions the coil 298 of the vane oscillator circuit will cause a contact 300 of a relay connected to this oscillator circuit to close. This relay contact closing action will permit the current to flow from the power source 280 through conductor 282 switch contact 300 to energize the down-wrap winding 302 of the wrap motor unit 212. It can be readily understood that as long as the low limit switch 304 of motor unit 212 and the interruptor switch 278 which has previously been described are closed then the motor will move the wrap arm 98 and wrap arm roller 96 to a position in which a smaller amount of the bottom liner 22 will be brought into contact with the heater roll 106.

From the aforementioned description it can be seen that a dead neutral control at and on either side of the set point has been effected in which no control action takes place. It can also be understood from the aforementioned description that an interruptor type of control action will be effected immediately when the temperature being sensed by the measuring circuit within this control unit extends beyond either end of the aforementioned dead neutral control limits. Further this interruptor type of control continues until the variable being sensed by the measuring circuit 183 is brought back gradually in a step by step fashion to the desired set point as has been previously described in the earlier part of the specification.

Figure 6:
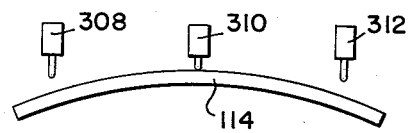
FIGURE 6 shows how electrical switches may be arranged to detect when the board is in a down-curl condition.

FIGURE 6 shows a cross section of a board 114 as it passes in the direction of the arrow 117 out of the right end of the machine shown in FIGURE 1 when this board possesses down-curl or in other words the longitudinal outer side portions of the board are at a lower position than the longitudinal center portion of the board.

Figure 7:
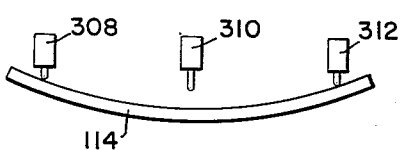
FIGURE 7 shows how the electrical switches in FIGURE 6 are arranged to detect when the board is in an up-curl direction.

FIGURE 7 on the other hand shows the condition that the outer side portions of the board 114 will be in if the board possesses up-curl or in other words a condition in which the longitudinal outer side portions of the board are at a higher elevation than the longitudinal center portion of the board.

Each of these FIGURES 6 and 7 also shows schematically how a suitable number of switches 308, 310, 312 of the general type such as is shown in the A. J. Mottlau Patent 1,668,974, the H. G. Leupold Patent 1,780,758, or the S. G. Ransome Patent 2,612,368 can be arranged to detect when this board 114 has deviated slightly from a desired flat condition to either of the aforementioned up or down-curl positions.

It will be observed that when the contacts of switch 310 are closed and the switches 308 and 312 are open then the board 114 will be in a down-curl condition. When however the contacts of switches 310 and 312 are closed and 310 is open then the board 114 will be in an up-curl condition.

Figure 8:
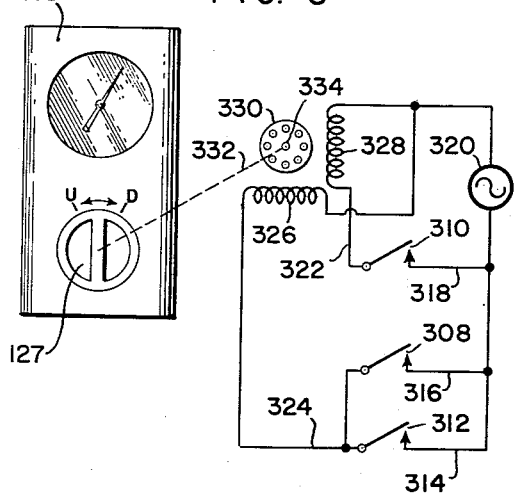
FIGURE 8 shows an electrical circuit in which an electric motor is employed along with the switches shown in FIGURES 6 and 7 to automatically adjust the position of a set point regulator in a clockwise or counterclockwise direction.

FIGURE 8 of the drawing shows a circuit having the aforementioned switches 308, 310, 312 employed therein and how they can be connected by way of suitable conductors 314, 316, 318 to a power source 320.

These switches 308, 310, and 312 are also shown connected by way of suitable conductors 322, 324 to the respective up-curl and down-curl windings 326, 328 of an electric motor 330. This FIGURE 8 also shows a suitable mechanical connection 332 which is employed between the rotary shaft 334 and the regulator 127 to transmit suitable rotary motion between these parts.

It can thus be seen that an electric circuit and switch arrangement has been shown in FIGURES 6–8 of the drawing whereby a down-curl condition which closes the switch 310 and which simultaneously opens switches 308 and 312 will cause the up-curl winding of the set point adjusting motor to be energized.

It can also be seen from the circuit diagram in FIGURE 8 that when an up-curl condition exists and the switches 308 and 312 are closed and the switch 310 is open this action will cause the down-curl winding of the set point adjusting motor to be energized.

The energization of the respective up and down-curl windings of the motor 330 will thus enable the set point of regulator 127 of the loading stations 118 to be automatically adjusted. In a similar manner a suitable rotary connection can be employed which is similar to the connection 332 between the motor 330 and the regulator 130. With such a control system it is then not necessary for a person to observe whether an up-curl or down-curl in the board 114 is present or to make any adjustments of the regulators 120 or 130 at the loading stations 118 and 121 to correct this condition.

Furthermore, such an electrical up-curl and down-curl electrical detecting system as that just described is beneficial in eliminating the possible error which the human eye can introduce particularly when it is required to observe the instant of time when only a slight up-curl or down-curl is introduced into the board 114.

It can thus be seen from the aforementioned description of the control apparatus disclosed herein that both a semi-automatic, FIGURE 1, or fully automatic, FIGURES 1, 6–8, has been disclosed for a corrugating machine which will maintain a board which the machine is producing in a flat condition. Furthermore, this control apparatus enables an operator of a corrugating machine to raise the set point temperature above a base temperature setting of certain board parts while it simultaneously lowers the set point temperature below a base temperature setting of other associated board part and thereby obtains a desired combination of moisture content and temperature conditions between the parts of the board which will result in the elimination of both curl and/or warp.

What is claimed is:

1. A control apparatus to maintain a certain temperature and moisture content relationship between an upper single face moist board and a lower moist liner moving through a corrugating machine, comprising a first temperature sensing means positioned adjacent said upper single face board and being operably connected to send a first electrical signal that is proportional to the temperature of said board to a first controller, a second temperature sensing means positioned adjacent said lower liner and being operably connected to send a second electrical signal that is proportional to the temperature of said lower liner to a second controller, an adjustable pressure regulating means having two ratio relays operably connected therewith to transmit an adjustable set point signal of increased magnitude to one of said controllers while it simultaneously transmits a set point signal of decreased magnitude to the other of said controllers, each of said controllers being responsive to differences in the magnitude of its associated electric and set point signals, said controller receiving said set point signal of increased magnitude being connected to transmit a control signal to a first wrap-arm actuating motor to thereby cause a wrap arm and roller unit attached to the shaft of said motor to be rotated in a direction to move a portion of said moving single face board into increased surface contact with a first heater roll and said controller receiving said second set point signal of decreased magnitude being operably connected to simultaneously transmit a control signal to a second wrap arm actuating motor to thereby cause a wrap arm and roller unit attached to the shaft of said last mentioned motor to be rotated in a direction to move a portion of said lower moist liner into a decreased surface contact with a second heater roll.

2. A control apparatus to maintain a certain temperature and moisture content relationship between an upper single face moist board and a lower moist liner moving through a corrugating machine, comprising a first temperature sensing means positioned adjacent said upper single face board and being operably connected to send a first electrical signal that is proportional to the temperature of said board to a first controller, a second temperature sensing means positioned adjacent said lower liner and being operably connected to send a second electrical signal that is proportional to the temperature of said lower liner to a second controller, an adjustable pressure regulating means having two ratio relays operably connected therewith to transmit an adjustable set point signal of increased magnitude to one of said controllers while it simultaneously transmits a set point signal of decreased magnitude to the other of said controllers, each of said controllers being responsive to differences in the magnitude of its associated electric and set point signals, said controller receiving said set point signal of decreasing magnitude being connected to transmit a control signal to a first wrap arm actuating motor to thereby cause a wrap arm and roller unit attached to the shaft of said motor to be rotated in a direction to move a portion of said moving single face board into decreased surface contact with a first heater roll and said controller receiving said set point signal of increased magnitude being operably connected to simultaneously transmit a control signal to a second wrap arm actuating motor to thereby cause a wrap arm and roller unit attached to the shaft of said motor to be rotated in a direction to move a portion of said lower moist liner into an increased surface contact with a second heater roll.

3. A moisture control apparatus to maintain a desired temperature and moisture content relationship between an upper single face moist board and a lower moist liner immediately before said board and liner are passed through a press roll of a corrugating machine to enable said machine to produce a flat board, comprising a first temperature sensing means operably connected to send a first electric signal that is proportional to the temperature of said upper single face board to an index setting mechanism of a first controller, a second temperature sensing means operably connected to send a second electric signal that is proportional to the temperature of said lower liner to an index setting mechanism of a second controller, a regulating apparatus operably connected to transmit a selected set point signal of increasing magnitude to an index setting mechanism of one of said controllers while it simultaneously transmits a set point signal of decreasing magnitude to the said index setting mechanism of the other of said controllers, each of said index setting mechanisms of said controllers being operably connected to produce an output control signal in accordance with its associated electric signal and its set point signal, said output signal being operably connected to move a wrap arm and roller mounted thereon to a position that will retain an associated heater roll in contact with a greater or less surface area of its associated moving single face board or lower liner depending on whether the magnitude of said control signal is decreasing or increasing.

4. A moisture control apparatus to maintain a desired temperature and moisture content relationship between an upper single-faced moist board and a lower moist liner immediately before said board and liner are passed through a press roll of a corrugating machine to enable said board and liner to be joined together and formed into a flat two-faced corrugated board, comprising a first temperature sensing means operably connected to send a first electric signal that is proportional to the temperature of said upper single face board to an index setting mechanism of a first controller, a second temperature sensing means operably connected to send a second electric signal that is proportional to the temperature of said lower liner to an index setting mechanism of a second controller, a regulating apparatus operably connected to transmit a selected set point signal of increasing magnitude to an index setting mechanism of one of said controllers while it simultaneously transmits a set point signal of decreasing magnitude to the said index setting mechanism of the other of said controllers, each of said index setting mechanisms of said controllers being operably connected to produce an output control signal in accordance with its associated electric signal and set point signal and each of said output signals being operably connected to move a wrap arm and roller mounted thereon to a position that will retain an associated heater roll in contact with a greater or less surface area of its associated moving single face board or lower liner depending on whether the magnitude of said control signal is decreasing or increasing.

5. Apparatus for controlling the drying operation in a corrugating machine through which an upper-face moist board and a lower moist liner is traveling to enable said machine to produce a flat double backer corrugated board, comprising a first controlling means for applying a variable amount of heat by means of a first wrap arm and heater roller to said upper-face moist board in accordance with the difference between the temperature of said upper face moist board being sensed by a first temperature sensing element and a first adjustable set point control signal being produced by a set point adjusting means, a second controlling means for applying varying amounts of heat by means of a second wrap arm and heater roll to said lower moist liner in accordance with the difference between the temperature of said lower moist liner being sensed by a second temperature sensing means and a second adjustable set point control signal being produced by said set point adjusting means, said first temperature sensing element being juxtapositioned with respect to said upper-face moist board and connected to transmit a signal to said first controlling means that is proportional to the temperature of said board, said second temperature sensing element juxtapositioned with respect to said lower moist liner and connected to transmit a signal to said controlling means that is effected by the temperature of said liner and said set point adjusting means that is operably connected to said first and second controlling means to thereby increase the magnitude of the said set point control signal that is being transmitted to said first controlling means while the magnitude of said other set point control signal that is being transmitted to said second controlling means is simultaneously decreased proportionally to said increase.

6. A moisture control apparatus to eliminate transverse up or down curl from a traveling upper liner board part, medium to be corrugated board part, a single face board part and a lower liner board part as they are made into a two-faced board by a corrugating machine, comprising four controllers each connected to produce an output control signal in accordance with the differences between the temperature of either said upper liner, medium to be corrugated, single face or lower liner board part and a set point control signal, said controllers each being respectively connected to control the quantity of heat heater rolls can apply to said upper liner and said medium to be corrugated before they are glued together to form said single-faced board and the combined single-faced board and the lower liner, a first temperature sensing element juxtapositioned with respect to said upper liner and connected to transmit a signal to one of said controllers whose magnitude is proportional to the temperature of said upper liner, a second temperature sensing element juxtapositioned with respect to said medium to be corrugated and connected to transmit a signal to a second of said controllers whose magnitude is proportional to the temperature of said medium to be corrugated, a third temperature sensing element juxtapositioned with respect to said single-faced board and connected to transmit a signal to a third controller of said four controllers whose magnitude is proportional to the temperature of said single-faced board, a fourth temperature sensing element juxtapositioned with respect to said lower liner and connected to transmit a signal to a fourth controller of said four controllers, whose magnitude is proportional to the temperature of said lower liner, a set point adjusting means operably connected to said first and second controllers to increase the magnitude of a first of said associated set point control signals being transmitted by way of a first transmitting means to said first controller while the magnitude of a second of said associated set point control signals which is being transmitted by way of a second transmitting means to said second controller is simultaneously decreased in a proportional manner to the magnitude of said first of said associated set point control signals and another set point adjusting means operably connected to said third and fourth controllers to increase the magnitude of a third of said associated set point control signals being transmitted by way of a third transmitting means to said third controller while the magnitude of a fourth of said associated set point control signals which is being transmitted by way of a fourth transmitting means to said fourth controller is simultaneously decreased in a proportional manner to said last mentioned increase.

7. An apparatus to control the position of wrap arm roller adjacent each of two heater rolls in a corrugating machine over each of which a traveling board part is passing to obtain a desired temperature and moisture content relationship between said board parts which will result in the production of a flat board by said machine comprising two temperature sensing means, each of said temperature sensing means being connected to a separate controlling means juxtapositioned with respect to one of said board parts to transmit an input signal to its associated controlling means in accordance with the temperature in said one or the other of said board parts and to transmit said signal that is proportional to said measurement to said one or the other of said controlling means, a regulating control means operably connected to each of said controlling means to transmit thereto a set point control signal that is either of a decreasing or increasing magnitude while it simultaneously transmits a set point control signal that varies proportionally with but the opposite direction from that of the said magnitude of the said first-mentioned set point control signal, each of said controlling means having an index setting mechanism to produce an output signal that is in accordance with the difference in said magnitude of said input signal and its associated set point control signal, means for transmitting each of said output signals to an electric motor to rotate same in one rotary direction or another depending on whether the said board being produced has an up or down-curl through an arcuate path commensurate with the magnitude of each said output signals, a mechanical connection between each of said motors and each of said respective wrap arm rollers for repositioning said roller and said board part connected thereto along said outer peripheral surface of said heater roller in accordance with changes occurring in said output signal.

8. A moisture controlling apparatus to instantaneously substantially eliminate cross-the-board curl from a board that is being produced by a corrugating machine, comprising a first radiation pyrometer to sense the temperature of a traveling upper single-face portion of said board before it is glued to a travelling lower liner of said board, a second radiation pyrometer to sense the temperature of a traveling lower liner of said board before it is glued to said single face portion, a first controller having an index setting mechanism operably connected with said first pyrometer for receiving a first input signal therefrom which is proportional to the temperature sensed thereby, a second controller having an index setting mechanism operably connected with said second pyrometer for receiving a second input signal therefrom which is proportional to the temperature sensed thereby, an adjustable regulating apparatus operably connected to generate and transmit a set point control signal to one of said index setting mechanisms whose magnitude is altered in one direction while it simultaneously transmits a set point control signal to the other of said index setting mechanisms whose magnitude is altered in an opposite direction, each of said controllers being operably connected to produce an output signal in accordance with the difference that exists between said two signals being received by this associated index setting mechanism said each of said output signals being operably connected to actuate a motor-driven wrap arm over which either the said single-face board portion or the said lower liner is wrapped to thereby increase or decrease the area of drying engagement which said board portion or lower liner makes with said heat rolls of said corrugating machine.

9. Apparatus for controlling the drying operation in a corrugating machine through which an upper face moist board and a lower moist liner is traveling to enable said machine to produce a flat double backer corrugated board, comprising a first controlling means for applying a variable amount of heat by means of a first wrap arm and heater roller to said upper face board in accordance with the difference between the temperature of said upper face board being sensed by a first temperature sensing element and a first adjustable set point control signal of increasing magnitude being produced by a set point adjusting means and a second controlling means for applying varying amounts of heat by means of a second wrap arm and heater roll to said lower liner in accordance with the difference between the temperature of said lower liner being sensed by a second temperature sensing means and a second adjustable set point control signal of decreasing magnitude being produced by said set point adjusting means.

10. The controlling apparatus as specified in claim 9 wherein said set point adjusting means employs a direct acting and reverse acting ratio relay to produce said set point control signal of increasing and decreasing magnitude.

11. A control apparatus to maintain a certain temperature and moisture content relationship between an upper moist liner and a medium to be corrugated which are moving through a corrugating machine, comprising a first temperature sensing means positioned adjacent said moist liner and being operably connected to send a first electrical signal that is proportional to the temperature of said liner to a first controller, a second temperature sensing means positioned adjacent said medium to be corrugated and being operably connected to send a second electrical signal that is proportional to the temperature of said medium to a second controller, an adjustable pressure regulating means having two ratio relays operably connected therewith to transmit an adjustable set point signal of increased magnitude to one of said controllers while it simultaneously transmits a set point signal of decreased magnitude to the other of said controllers, each of said controllers being responsive to differences in the magnitude of its associated electric and set point signals, said controller receiving said set point signal of increasing magnitude being connected to transmit a control signal to a first wrap arm actuating motor to thereby cause a wrap arm and roller unit attached to the shaft of said motor to be rotated in a direction to move a portion of said moving moist liner into increased surface contact with a first heater roll and said controller receiving said second set point signal of decreased magnitude being operably connected to simultaneously transmit a control signal to a second wrap arm actuating motor to thereby cause a warp arm and roller unit attached to the shaft of said last-mentioned motor to be rotated in a direction to move a portion of said medium into a decreased surface contact with said second heater roller.

12. Apparatus for controlling the drying operation in a corrugating machine through which an upper-face moist board and a lower moist liner is travelling to enable said machine to produce a flat double backer corrugated board, comprising a first dual vane-type floating controller for applying a variable amount of heat by means of a first wrap arm and heater roller to said upper face board in accordance with the difference between the temperature of said upper face board being sensed by a first temperature sensing element and a first adjustable set point control signal of increasing magnitude being produced by a set point adjusting means and a second dual vane-type floating controller for applying varying amounts of heat by means of a second wrap arm and heater roll to said lower liner in accordance with the difference between the temperature of said lower liner being sensed by a second temperature sensing means and a second adjustable set point control signal of decreasing magnitude being produced by said set point adjusting means.

13. The controlling apparatus as specified in claim 12 wherein each of said dual vane-type floating controllers are connected by way of an oscillating coil circuit relay with an electric motor to effect a change in position of said wrap arm and the amount of board part that can be brought into physical contact with said heater roller only after the magnitude of the temperature being sensed by the controllers associated temperature sensing element has exceeded or dropped below the magnitude of said set point value.

14. The controlling apparatus as specified in claim 9 in which a plurality of switches are employed that each have a movable switch part in contact with said board that is being produced by said corrugating machine, certain of said switches being positioned to be closed or opened by said board that is juxtapositioned therewith depending on whether an up-curl or a down-curl is present in said board and an electrical circuit connection between said switches and a reversible electric motor to cause one or the other of the windings of said motor to be energized and a rotatable connection between said motor and said set point adjusting means to cause a set point control signal of increasing magnitude to be transmitted to said controlling means that is controlling the temperature of said upper face board when down-curl in said board occurs while it causes a set point control signal of decreasing magnitude to be transmitted to said other remaining controlling means.

15. The controlling apparatus as specified in claim 9 in which a plurality of switches are employed that each have a movable switch part in contact with said board that is being produced by said corrugating machine, certain of said switches being positioned to be closed or open by said board that is juxtapositioned therewith depending on whether an up-curl or a down-curl is present in said board and an electrical circuit connection between said switches and a reversible electric motor to cause one or the other of the windings of said motor to be energized and a rotatable connection between said motor and said set point adjusting means to cause a set point control signal of decreasing magnitude to be transmitted to said controlling means that is controlling the temperature of said upper face board when up-curl in said board occurs while it causes a set point control signal of increasing magnitude to be transmitted to said other remaining controlling means.

16. The controlling apparatus as specified in claim 9 in which a plurality of switches are employed that each have a movable switch part in contact with said board that is being produced by said corrugating machine, certain of said switches being positioned to be closed or opened by said board that is juxtapositioned therewith depending on whether an up-curl or a down-curl is present in said board and an electrical circuit connection between said switches and a reversible electric motor to cause one or the other of the windings of said motor to be energized and a rotatable connection between said motor and said set point adjusting means to cause a set point control signal of increasing magnitude to be transmitted to said controlling means that is controlling the temperature of a lower liner of said board when up-curl in said board occurs while it causes a set point control signal of decreasing magnitude to be transmitted to said other remaining controller.

17. The controlling apparatus as specified in claim 9 in which a plurality of switches are employed that each have a movable switch part in contact with said board that is being produced by said corrugating machine, certain of said switches being positioned to be closed or opened by said board that is justapositioned therewith depending on whether an up-cural or a down-curl is present in said board and an electrical circuit connection between said switches and a reversible electric motor to cause one or the other of the windings of said motor to be energized and a rotatable connection between said motor and said set point adjusting means to cause a set point control signal of decreasing magnitude to be transmitted to said controlling means that is controlling the temperature of a lower liner of said board when down-curl in said board occurs while it causes a set point control signal of increasing magnitude to be transmitted to said other remaining controller.

18. Apparatus for controlling the drying operation of a spaced-apart single-face moist board and a moist lower liner being formed into a double backer corrugated board in a corrugating machine, having separate heating means and an adjustable wrap arm for varying the heat ing effect of the heating means for the single-faced board and the lower liner, to enable said machine to produce a substantial curl and warp-free double backer corrugated board, comprising a first controlling means for applying a variable amount of heat by adjusting a first wrap arm of one of the heating means to said single face board in accordance with the difference between the temperature of said single face board being sensed by a first temperature sensing element and a first adjustable set point control signal of increasing magnitude being produced by a set point adjusting means, and a second controlling means for applying varying amounts of heat by adjusting a second wrap arm of the other of said heating means to said lower liner in accordance with the difference between the temperature of said lower liner being sensed by a second temperature sensing means and a second adjustable set point control signal of decreasing magnitude being produced by said set point adjusting means.

19. A method of maintaining the moisture content and temperature condition of each constituent layer of a board passing through a corrugating machine at preselected values to enable said machine to produce a multi-layer substantially curl-free board, said method consisting of effecting, in response to the curling of the board in one direction, an increase in a regulated amount of heat being applied to upper liner and single-faced portions of said board and sumultaneously effecting a reduction in a regulated amount of heat being applied to a layer of the board to be corrugated and the lower liner portion of said board, and effecting, in response to curling of the board in the other direction, a decrease in a regulated amount of heat being applied to the upper liner and single-faced portions of said board and simultaneously effecting an increase in a regulated amount of heat being applied to a layer of the board to be corrugated and the lower liner portion of said board.

References Cited in the file of this patent

UNITED STATES PATENTS

| | | |
|---|---|---|
| 2,642,676 | Grimm | June 23, 1953 |
| 2,941,573 | Cassady | June 21, 1960 |